US010501333B2

(12) United States Patent
Aga et al.

(10) Patent No.: US 10,501,333 B2
(45) Date of Patent: Dec. 10, 2019

(54) SPHERICAL FERRITE POWDER, RESIN COMPOUND INCLUDING SPHERICAL FERRITE POWDER, AND MOLDED PRODUCT MADE OF RESIN COMPOUND

(71) Applicants: POWDERTECH CO., LTD., Chiba (JP); TATSUTA ELECTRIC WIRE & CABLE CO., LTD., Osaka (JP)

(72) Inventors: Koji Aga, Chiba (JP); Tetsuya Igarashi, Chiba (JP); Akio Takahashi, Kyoto (JP)

(73) Assignees: POWDERTECH CO., LTD., Chiba (JP); TATSUTA ELECTRIC WIRE & CABLE CO., LTD., Osaka (JP)

( * ) Notice: Subject to any disclaimer, the term of this patent is extended or adjusted under 35 U.S.C. 154(b) by 116 days.

(21) Appl. No.: 15/511,492

(22) PCT Filed: Aug. 31, 2015

(86) PCT No.: PCT/JP2015/074657
§ 371 (c)(1),
(2) Date: Mar. 15, 2017

(87) PCT Pub. No.: WO2016/043031
PCT Pub. Date: Mar. 24, 2016

(65) Prior Publication Data
US 2018/0179082 A1 Jun. 28, 2018

(30) Foreign Application Priority Data

Sep. 19, 2014 (JP) ................. 2014-191984

(51) Int. Cl.
| | | |
|---|---|---|
| C01G 49/00 | (2006.01) | |
| C08K 3/22 | (2006.01) | |
| C08K 9/04 | (2006.01) | |
| C08L 101/00 | (2006.01) | |
| H01F 1/00 | (2006.01) | |
| C09C 1/24 | (2006.01) | |
| H01F 1/37 | (2006.01) | |
| C09C 1/22 | (2006.01) | |

(52) U.S. Cl.
CPC ............ *C01G 49/0072* (2013.01); *C08K 3/22* (2013.01); *C08K 9/04* (2013.01); *C08L 101/00* (2013.01); *C09C 1/22* (2013.01); *C09C 1/24* (2013.01); *H01F 1/00* (2013.01); *H01F 1/37* (2013.01); *C01P 2002/50* (2013.01); *C01P 2004/32* (2013.01); *C01P 2004/51* (2013.01); *C01P 2004/61* (2013.01); *C01P 2006/12* (2013.01); *C01P 2006/42* (2013.01); *C08K 2003/2265* (2013.01)

(58) Field of Classification Search
None
See application file for complete search history.

(56) References Cited

U.S. PATENT DOCUMENTS

| | | | | |
|---|---|---|---|---|
| 5,512,402 | A * | 4/1996 | Okado ................. | G03G 9/0918 |
| | | | | 430/110.4 |
| 2007/0154833 | A1* | 7/2007 | Kayamoto ............ | G03G 9/107 |
| | | | | 430/111.31 |
| 2007/0196671 | A1 | 8/2007 | Kobayashi | |
| 2008/0255293 | A1 | 10/2008 | Sasaki et al. | |
| 2010/0193972 | A1* | 8/2010 | Yamamoto ......... | C01G 49/0018 |
| | | | | 257/789 |
| 2010/0279221 | A1* | 11/2010 | Wada .................... | G03G 9/107 |
| | | | | 430/105 |
| 2013/0183614 | A1* | 7/2013 | Aga ....................... | G03G 9/107 |
| | | | | 430/106.2 |
| 2014/0035714 | A1 | 2/2014 | Lee et al. | |
| 2016/0276078 | A1* | 9/2016 | Pagano ................... | H01F 1/26 |
| 2018/0008921 | A1* | 1/2018 | Aga ........................ | B01D 39/06 |
| 2018/0008966 | A1* | 1/2018 | Aga ........................ | B01J 23/005 |
| 2018/0011414 | A1* | 1/2018 | Aga ........................ | C01G 49/00 |

FOREIGN PATENT DOCUMENTS

| | | |
|---|---|---|
| EP | 2692692 A1 | 2/2014 |
| JP | H02198106 A | 8/1990 |
| JP | H05335121 A | 12/1993 |
| JP | 2005139050 A | 6/2005 |
| JP | 2005286190 A | 10/2005 |
| JP | 2005347449 A | 12/2005 |
| JP | 2006160560 A | 6/2006 |
| JP | 2006332294 A | 12/2006 |
| WO | 2007108437 A1 | 9/2007 |
| WO | 2007141843 A1 | 12/2007 |

OTHER PUBLICATIONS

Extended European Search Report from Application No. 15841973.9 dated Mar. 26, 2018.
International Search Report issued with respect to Application No. PCT/JP2015/074657, dated Nov. 2, 2015.
International Preliminary Report on Patentability issued with respect to Application No. PCT/JP2015/074657, dated Mar. 21, 2017.

* cited by examiner

*Primary Examiner* — Kevin M Bernatz
(74) *Attorney, Agent, or Firm* — Greenblum & Bernstein, P.L.C.

(57) ABSTRACT

The present invention provides a spherical ferrite powder that is excellent in filling ability and moldability if used as a filler, is excellent in handling ability, and is high in resistivity; a resin compound including the ferrite powder; and a molded product made of the resin compound. The spherical ferrite powder including 15 to 30 wt % of ferrite particles having the particle diameter less than 11 μm and have the volume average particle diameter of 10 to 50 μm; the resin compound including the ferrite powder; and the molded product made of the resin compound are employed.

6 Claims, No Drawings

SPHERICAL FERRITE POWDER, RESIN COMPOUND INCLUDING SPHERICAL FERRITE POWDER, AND MOLDED PRODUCT MADE OF RESIN COMPOUND

TECHNICAL FIELD

The present invention relates to a spherical ferrite powder that is excellent in filling ability and moldability if used as a filler, is excellent in handling ability, and is high in resistivity; a resin compound including the ferrite powder; and a molded product made of the resin compound.

BACKGROUND ART

In various applications using sealing materials for semiconductor LSIs and the like, various resin compounds prepared by mixing an inorganic filler with a resin have been used and proposed.

Nowadays, inorganic fillers having a variety of compositions, average particle diameters, powder properties, and electrical properties are generally used for mixing with resins.

If a filler is added to a resin having high fluidity, an increased amount of the filler added typically decreases the fluidity of the resin compound after finishing adding of the filler, even the particle diameter of the filler or the viscosity of the resin influences. In contrast, if the particle diameter of the filler is large, an increase in the amount of the filler added does not always decrease fluidity. So, a plurality of fillers including a filler mainly for achievement of performance and a filler for control of the fluidity of the resin compound are added in many case.

Examples of the filler mainly for achievement of performance include various powders of metals and/or metal oxides. Examples of the filler for fluidity control include silica powders and carbon black.

In some cases, fillers including silica powders having same composition and different particle diameters having a wide particle size distribution may be used to achieve control of the fluidity of a resin compound. Further, the controlled fluidity and improvement of the filler content may be achieved by the filler such as an irregularly-shaped ferrite powder by making the particle size distribution wide.

A filler is selected depending on the intended application. If a magnetic filler is used for an electromagnetic wave absorption, it is difficult to achieve both a high filler content and a high volume resistivity because control of the various powder properties (such as the average particle diameter, particle size distribution, and shape) of the magnetic filler and adjustment of electrical properties is necessary.

Application using many ferrite powders as magnetic fillers have been proposed. For example, Patent Document 1 (Japanese Patent Laid-Open No. 5-335121) discloses a magnetic sealing material made of a resin containing a ferrite powder surface-treated with a silane coupling agent. It is stated that the magnetic sealing material provides an increased strength and good mold releasability.

Patent Document 2 (Japanese Patent Laid-Open No. 2005-139050) discloses a spherical magnetic ferrite powder having a volume specific resistivity of $5 \times 10^7$ $\Omega$m ($5 \times 10^9$ $\Omega$cm) or more at 120° C. and a volume specific resistivity of $3 \times 10^9$ $\Omega$m ($3 \times 10^{11}$ $\Omega$cm) or more at 25° C. In addition, Patent Document 2 further discloses a resin compound for semiconductor sealing that contains the magnetic ferrite powder which is used together with a silica particle.

Patent Document 2 states that the magnetic ferrite powder disclosed has electromagnetic wave shielding ability and electrical insulating properties, and further, the resin compound for semiconductor sealing which contains the magnetic ferrite powder is highly reliable.

Patent Document 3 (Japanese Patent Laid-Open No. 2005-347449) discloses a soft magnetic powder having a frequency particle size distribution in which a maximum value A exists in the range from 10 µm to 50 µm and a minimum value B exists in the range from 0.5 µm to 10 µm (exclusive of 10 µm); and an organic material prepared by blending the soft magnetic powder with a resin or rubber. Patent Document 3 states that a molded product excellent in electromagnetic wave absorption and heat radiation should be manufactured.

However, the magnetic powders disclosed in Patent Documents 1 to 3 are not the magnetic powder that are good in filling ability if used as a filler, are not excellent in handling properties, and are not high in resistivity prepared even if various powder properties (such as the average particle diameter, particle size distribution, and shape) and electrical properties are adjusted.

Patent Document 4 (Japanese National Publication of International Application NO. 2007/108437) discloses a silica powder at least characterized in that the maximum frequency value for the mode peak 1 present in the particle size range from 1 to 4 µm and a maximum frequency value for the mode peak 2 present in the particle size range from 15 to 55 µm observed in the volume frequency particle size distribution determined by a laser diffraction-scattering method. Wherein, the maximum frequency value for the mode peak 2 is greater than that for the mode peak 1; the mode peak 2 has a shoulder; and the content of particles having particle size range of 15 to 55 µm is greater than the particles having particle size range of 1 to 4 µm. It is also stated that the composition including the silica powder blended with at least either one of rubber or resin is used as a semiconductor-sealing material.

Patent Document 4 states that a sealing material filled with a high content of silica powder which has good moldability, and is less in burr generation should be manufactured. However, Patent Document 4 relates to a silica powder used as a filler for fluidity control and does not relate to a ferrite powder used as a filler for achievement of performance.

DOCUMENTS CITED

Patent Documents

[Patent Document 1]
  Japanese Patent Laid-Open No. 5-335121
[Patent Document 2]
  Japanese Patent Laid-Open No. 2005-139050
[Patent Document 3]
  Japanese Patent Laid-Open No. 2005-347449
[Patent Document 4]
  Japanese National Publication of International Application NO. 2007/108437

SUMMARY OF INVENTION

Problems to be Solved

So, an object of the present invention is to provide a spherical ferrite powder that is excellent in filling ability and moldability if used as a filler, is excellent in handling ability, and is high in resistivity; a resin compound including the ferrite powder; and a molded product made of the resin compound.

Means to Solve the Problem

As a result of extensive investigation to solve the problems described above, the present inventors have arrived at the present invention by thinking out that the ferrite powder that has high filling ability and moldability if used as a filler as well as excellent handling properties and is high in resistivity should achieve the object described above if the ferrite particles having a spherical shape, a predetermined particle diameter, and a predetermined particle size distribution are employed. Note that the words "ferrite particles" refer to the individual particles or the gathered particles having adjusted particle diameters, and the words "ferrite powder" refer to whole of the ferrite particles.

That is, the present invention provides the spherical ferrite powder characterized in including 15 to 30 wt % of ferrite particles having the particle diameter of less than 11 μm and have the volume average particle diameter of 10 to 50 μm.

The spherical ferrite powder according to the present invention is preferable that the ferrite particles having the particle diameter of 11 μm or more are coated with a resin.

The present invention also provides the resin compound including 50 to 99.5 wt % of the spherical ferrite powder.

The present invention also provides a molded product formed by molding the resin compound.

Advantages of the Invention

The ferrite powder according to the present invention is high in filling ability and moldability if used as a filler and excellent in handling properties, and is high in resistivity because the ferrite powder include the ferrite particles having the spherical shape, the predetermined particle diameter, and the predetermined particle size distribution.

PREFERRED EMBODIMENTS OF THE INVENTION

Embodiments of the present invention will be described.
<Ferrite Powder According to the Present Invention>

The ferrite powder according to the present invention has a spherical shape as described above. If the ferrite powder has a shape other than a spherical shape, such as an irregular, granular, or flaky, the shape cannot provide a sufficiently high filling amount if used as a filler. In particular, the electromagnetic wave absorbing ability depends on not only the magnetic properties of the magnetic powder, but also increases with an increased amount of the magnetic material per unit weight in the application such as electromagnetic wave absorption. So, the powder should have a spherical shape.

The term "spherical" refers to a shape in which a shape factor SF-1 is 100 to 120, preferably 100 to 110, and more preferably as close to 100 as possible. If the shape factor SF-1 is more than 120, the ferrite particles are poor in sphericity.

Shape factor SF-1: The shape factor SF-1 of ferrite particles having a particle diameter of less than 11 μm is determined by taking an image with a FE-SEM at a magnification of 50000, in the field of view adjusted to find a total of 100 or more particles. The shape factor SF-1 of ferrite particles having a particle diameter of 11 μm or more is determined by taking an image with a FE-SEM at a magnification of 800, in the field of view adjusted to find a total of 100 or more particles. The image data are introduced into image analysis software manufactured by Media Cybernetics, Inc. ("Image-Pro PLUS") via an interface and analyzed to determine circle equivalent diameters and projected areas. The shape factors are values calculated by the expression described later. The more spherical the shape of the ferrite particles is closer to the value 100. The shape factors SF-1 of the ferrite particles having the particle diameter less than 11 μm and the ferrite particles having the particle diameter of 11 μm or more are each calculated for the particles, and the average of values calculated for 100 particles is defined as the shape factor SF-1 of the ferrite articles.

$$SF\text{-}1 = (R^2/S) \times (\pi/4) \times 100 \qquad \text{[Expression 1]}$$

R: Circle equivalent diameter, S: Area (projected area)

The spherical ferrite powder according to the present invention includes 15 to 30 wt % of ferrite particles having a particle diameter less than 11 μm. If the content of the ferrite particles is more than 30 wt %, the resin compound prepared by adding the ferrite powder as a filler to a resin may tends to be high in viscosity and molding may be difficult. If the content of the ferrite particles is less than 15 wt %, the resin compound prepared by adding the ferrite powder as a filler to a resin may be too low in viscosity and molding may be difficult.

The volume average particle diameter of the spherical ferrite powder according to the present invention is 10 to 50 μm. If the volume average particle diameter is less than 10 μm, the resin compound produced by adding the ferrite powder as a filler to a resin may tends to be high in viscosity and molding may be difficult. In other words, if only the filler having a particle diameter of less than 10 μm, the amount of the filler added should be less to adjust the viscosity in a certain level, i.e. it is hard to achieve high content of the filler. If the volume average particle diameter is more than 50 μm, the resin compound prepared by adding the ferrite powder as a filler may tends to be low in viscosity and molding may be difficult.

Although, the volume average particle diameter and the content of the ferrite particles having a particle diameter of less than 11 μm may be determined depending on the type of the resin (including an additive) to which the ferrite powder is added and the shape of the intended molded product. However, if the volume average particle diameter and the content in the ranges described above are employed in combination, it is easy to achieve fluidity adjustment with higher filler content.

The volume average particle diameter is determined using a Microtrac particle size analyzer manufactured by NIKKISO CO., LTD (Model 9320-X100). Water is used as the dispersion medium. A sample weighed 10 g and 80 ml of water is placed in a 100 ml beaker, into which 2 to 3 droplets of a dispersant (sodium hexametaphosphate) is added. Next, the ultrasonic homogenizer (UH-150, manufactured by SMT. Co., LTD.) set the output level 4 for 20 seconds is used to finish dispersing. After that, bubbles formed on the surface of the beaker are removed, and the sample is then introduced into the analyzer.

The ferrite powder according to the present invention is preferable that the ferrite particles having the particle diameter of 11 μm or more are coated with a resin. As the higher the content of the filler, the effect of the filler is greater. As a result, a current flows through passage where the spherical ferrite particles having a lower resistivity than the resin contact each other even if the filler is blended and dispersed in a resin. As the filler particles coated with a resin makes them less likely to contact each other, the high-resistivity resin compound and a molded product formed by molding the compound are easily manufactured.

The coating resin is not particularly limited. Examples of the resin include fluorine-contained resins, acrylic resins, epoxy resins, polyamide resins, polyamide-imide resins, polyester resins, unsaturated polyester resins, urea resins, melamine resins, alkyd resins, phenolic resins, fluorinated acrylic resins, acrylic styrene resins, silicone resins, and modified silicone resins modified with any of various resins such as acrylic resins, polyester resins, epoxy resins, polyamide resins, polyamide-imide resins, alkyd resins, urethane resins, and fluorine-contained resins. In terms of detachment of the resin caused by mechanical stress in use, it is preferable to use a thermosetting resin. Specific examples of the thermosetting resin include epoxy resins, phenolic resins, silicone resins, unsaturated polyester resins, urea resins, melamine resins, alkyd resins, and resins containing any of these resins. The amount of the coating resin is preferable to be 0.5 to 5.0 parts by weight against to 100 parts by weight of the ferrite particles.

A coupling agent for improvement of the thermosetting properties and solvent resistance may be contained in the coating resin. Examples of the coupling agent include various silane coupling agents. In injection molding of the resin compound, the coating resin exposed to high temperature may be detached or transformed to make the resistivity of the molded product decreases. However, addition of the coupling agent may prevent such phenomena. The type of the coupling agent applicable is not particularly limited. Preferable coupling agents includes an amino functional silane coupling agent, an epoxy functional silane coupling agent.

The ferrite powder according to the present invention is preferable that the ferrite particles having a particle diameter less than 11 μm are coated with an Al compound. The ferrite particles having a particle diameter less than 11 μm exist in the voids between the ferrite particles having a particle diameter of 11 μm or more. As the ferrite particles having a particle diameter less than 11 μm have a large specific surface area, they are poor in dispersibility and are likely to be aggregated in the resin compound and act as a passage through which an electric current flows. As coating of the particles with an Al compound reduces the electric current that flows on the surfaces of the particles, a high-resistivity resin compound and a molded product produced by molding the resin compound may be manufactured. Examples of the Al compound include aluminum sulfate and sodium aluminate. The amount of the surface treatment agent converted to Al is 0.2 to 1 wt % against to the ferrite particles.

The ferrite powder according to the present invention is preferable to have a chemical composition represented by the following formula (1).

[Chemical Formula 1]

(1)

$x=35$ to 45 mol %, $y=5$ to 15 mol %
$z=40$ to 60 mol %, $x+y+z=100$ mol %

In the composition represented by the chemical formula (1), it is preferable that a part of (MnO) and/or (MgO) are substituted by SrO and the amount of substituted SrO is 0.1 to 2.5 mol %.

As the ferrite powder containing the substituted SrO of more than 2.5 mol % may show characteristics as a hard ferrite, various performances may drastically deteriorate when used as a filler. The amount of SrO is preferable to be 2.0 mol % or less and more preferable to be 1.5 mol % or less.

Contents of Fe, Mn, Mg, and Sr: Contents of Fe, Mn, Mg, and Sr are determined as follows. 0.2 g weighed sample (ferrite powder) is fully dissolved in a heated mixture of 60 ml of pure water with 20 ml of 1N hydrochloric acid and 20 ml of 1N nitric acid to prepare an aqueous solution. Contents of Fe, Mn, Mg, and Sr are determined from analysis using an ICP analyzer (ICPS-1000IV, manufactured by Shimadzu Corporation).

The ferrite powder according to the present invention is preferable to have a magnetization of 35 to 95 Am$^2$/kg at 5 K·1000/4π·A/m.

If the magnetization of the ferrite powder at 5 K·1000/4π·A/m is less than 35 Am$^2$/kg, the electromagnetic wave absorbing ability may be not enough. The magnetization of soft ferrite never exceeds 95 Am$^2$/kg.

Magnetization: The vibrating sample magnetometer (model: VSM-C7-10A (manufactured by Toei Industry Co., Ltd.)) is used. The examination sample is placed in the cell having the inner diameter of 5 mm and the height of 2 mm and set to the magnetometer. In the examination, the magnetic field is applied and swept to 5 K·1000/4π·A/m. Next, the applied magnetic field is decreased, and the hysteresis curve is drawn. The magnetization is determined from the data of the curve.

The larger-diameter ferrite particles according to the present invention before resin coating having a particle diameter of 11 μm or more is preferable to have the BET specific surface area of 0.1 to 2 m$^2$/g. The BET specific surface area is more preferable to be 0.2 to 2 m$^2$/g.

If the BET specific surface area of the larger-diameter ferrite particles exceeds 2 m$^2$/g, the content of the ferrite particles having the particle diameter less than 11 μm may increase. As a result, fluidity of the resin compound decreases to make molding difficult. If the BET specific surface area is less than 0.1 m$^2$/g, fluidity of the resin compound may be too excessive to make molding difficult.

The smaller-diameter ferrite particles according to the present invention having the particle diameter of less than 11 μm is preferable to have a BET specific surface area of 2 to 50 m$^2$/g. The BET specific surface area is more preferable to be 2 to 40 m$^2$/g and most preferable to be 2 to 35 m$^2$/g.

If the BET specific surface area of the smaller-diameter ferrite particles is less than 2 m$^2$/g, as the content of the ferrite particles having a particle diameter less than 11 μm may be too small, increased fluidity may fail molding. If the BET specific surface area is more than 50 m$^2$/g, fluidity may be too poor to make molding difficult. BET specific surface area: The BET specific surface area is examined using the BET specific surface area analyzer manufactured by Mountech Co., Ltd. (Macsorb HM model-1210). The examination sample is treated for 2 hours in a vacuum dryer at normal temperature. The treated sample is closely packed in a cell and set to the analyzer. The examination is carried out after a pretreatment at a degassing temperature of 40° C. for 60 minutes.

The ferrite powder according to the present invention is preferable to have the volume resistivity of 1×10$^6$ to 5×10$^9$ Ω·cm at the normal temperature and humidity. The volume resistivity is more preferably 1×10$^7$ to 5×10$^9$ Ω·cm and most preferably 1×10$^7$ to 5×10$^8$ Ω·cm. The normal temperature and humidity (N/N) is the temperature of 20 to 25° C. and the relative humidity of 50 to 60%.

The volume resistivity of the ferrite powder of less than 1×10$^6$ Ω·cm at normal temperature and humidity is not preferable because sufficient insulating properties cannot be achieved in the molded product even the molded product is finished after mixing and dispersing with the resin. The volume resistivity of more than $5 \times 10^9$ Ω·cm means that content of the particles having the particle diameter less than 11 μm is less than 15 wt %, and the resin compound prepared by mixing the ferrite powder with the resin may possively fail adjustment of the fluidity.

Volume resistivity: The sample is packed in the cylinder made of the fluorine-containing resin and having the cross-sectional area of 4 cm$^2$ and the height of 4 mm, electrodes are set on both ends of the sample, and a 1 kg weight is further placed on the top to conduct resistivity examination. The resistivity examination is conducted using 6517 A insulation resistivity meter manufactured by Keithley Instruments, Inc. With voltage loaded of 25 V, the resistivity is calculated from the electric current value reached after 60 seconds (current value at 60 sec), and the resistivity is determined as the volume resistivity.

<Resin Compound According to the Present Invention>

The resin compound according to the present invention contains 50 to 99.5 wt % of the spherical ferrite powder. If the content of the ferrite powder is less than 50 wt %, the resin compound may not achieve performance of the ferrite sufficiently even the ferrite powder is contained. If the content of the ferrite powder exceeds 99.5 wt %, the molding may fail due to little resin contained.

The resin used in the resin compound is not particularly limited, and examples include epoxy resins, phenolic resins, melamine resins, urea resins, and fluorine-containing resins. In addition, the resin compound contains a curing agent and curing accelerator and further contains any of various additives such as silica particles according to needs.

<Molded Product According to the Present Invention>

The molded product according to the present invention is manufactured by molding and thermally curing the resin compound. The molded product is used in applications, such as LSI sealing material for electromagnetic wave absorption.

<Method of Manufacturing Ferrite Powder According to the Present Invention>

The method of manufacturing the ferrite powder according to the present invention will be described.

In the method of manufacturing the ferrite powder according to the present invention, appropriate amounts of raw materials are weighed, followed by pulverizing and mixing using a ball mill, a vibration mill, or the like for 0.5 hours or more, preferably for 1 to 20 hours. The raw materials are not particularly limited, but are preferably selected to achieve the composition described above.

The pulverized material produced as above is pelletized using a compression molding machine, followed by calcining at a temperature of 700 to 1300° C. If the compression molding machine is not used, the pulverized product may be added water to form a slurry, and the slurry may be formed into particles using a spray dryer. The calcined product will be further pulverized with a ball mill, a vibration mill, or the like, added a binder, and granulated using a dry blender such as a Henschel mixer.

The granulated material produced is flame-sprayed in air for ferritizing. In the flame-spraying, the combustible gas and oxygen are used to generate combustible gas combusted flame, and the volume ratio between the combustible gas and oxygen is 1:3.5 to 6.0. If the ratio of oxygen to combustible gas in the combustible gas combusted flame is less than 3.5, sufficient melting is not achieved. If the ratio of oxygen to combustible gas exceeds 6.0, ferritization is made difficult. For example, oxygen is used at the rate of 35 to 60 Nm$^3$/hr against the combustible gas rate of 10 Nm$^3$/hr.

Examples of the combustible gas used for the flame-spraying described above include propane gas, propylene gas, and acetylene gas and, in particular, propane gas is suitably used. Nitrogen, oxygen, or air is used as a granulated product-carrying gas. The linear velocity of the granulated product is preferable to be 20 to 60 m/sec.

The ferrite powder manufactured through ferritization by flame-spraying is rapidly cooled and solidified in water or in a room-temperature atmosphere and then collected by a filter.

After that, the ferrite powder collected by the filter is subjected to classification according to needs. The popular method such as wind power classification, mesh filtration, or a settling method is used as the classification method to adjust particle size in the target diameter. The collecting may be accomplished by separating large-diameter particles with a cyclone or the like.

As described above, the surfaces of the ferrite particles having a particle diameter of 11 μm or more is preferable to be coated with a resin after preparation of the spherical ferrite powder. In particular, the powder properties are often influenced by the material present on the surfaces of the ferrite particles and by the properties of the material. So, the electrical resistivity and handling properties (such as the dispersibility in a resin, the mixability with fine particles added to the resin compound other than the ferrite particles, and/or the curability of the molded product in molding) of the intended molded product produced after molding are controlled by surface coating with an appropriate resin. The coating method may be any of known methods such as a brush coating method, a dry coating method, a spray drying method using a fluidized bed, a rotary drying method, and a dipping and drying method using a versatile mixer. A method using a fluidized bed is preferable to improve the coating efficiency. If baking is conducted after resin coating, either an external heating method or internal heating method may be used. For example, the baking may be conducted using a fixed-bed or fluidized-bed electric furnace, a rotary electric furnace, or a burner furnace or microwaves. If the resin used is a UV-curable resin, a UV irradiator is used. The temperature for baking depends on the resin used, and must be equal to or higher than the melting point or glass-transition point of the resin. If the resin is a thermosetting resin or a condensation-crosslinkable resin, the temperature should be elevated up to the temperature where curing completes.

The surfaces of the ferrite particles having a particle diameter less than 11 μm are preferable to be coated with an Al compound after preparation of the spherical ferrite powder. Surface coating is finished by dispersing the ferrite particles in water followed by dripping an aqueous solution of an Al compound into the dispersion slurry. Al compounds are preferable since they make dispersion of the ferrite particles in a resin easy without aggregation in mixing of the ferrite particles with the resin. The dispersibility in a hydroxyl-containing resin is particularly improved, although the reason is not clearly known.

<Method of Manufacturing Resin Compound According to the Present Invention>

The resin compound according to the present invention is manufactured as follows. The spherical ferrite powder, the resin, the curing agent, the curing accelerator and the additives such as silica particles according to needs are mixed using a mixer such as a roll mill or kneader to finish the resin compound.

<Method of Manufacturing Molded Product According to the Present Invention>

The molded product according to the present invention is manufactured by molding followed by thermally curing the resin compound. The molding method applicable include doctor blade method, extrusion method, pressing method and calendar rolling method. The thermal curing method may be an external heating method or internal heating method. For example, the thermal curing may be conducted using a fixed-bed or fluidized-bed electric furnace, a rotary electric furnace, or a burner furnace or microwaves.

The present invention will be specifically described with reference to the examples.

Example 1

Larger-diameter ferrite particles: Appropriate amounts of the raw materials were weighed to adjust the $Mn_3O_4$ content 12 mol %, the $Mg(OH)_2$ content 11 mol %, the $Fe_2O_3$ content 52 mol %, and the SrO content 1 mol %. Water was added to the raw materials followed by pulverizing and mixing for 6 hours with the wet ball mill to prepare the slurry. The slurry was subjected to granulation and drying, and the granulated product was kept in air at 1135° C. for 6 hours and then pulverized to prepare the Mn—Mg—Sr ferrite powder (first calcined powder).

The first calcined powder having an average particle diameter of 20 μm was prepared by subjecting the ferrite powder prepared to sphering process: passing the ferrite powder through the flame generated from propane supplied at a rate of 5 $Nm^3$/hr and oxygen supplied at a rate of 25 $Nm^3$/hr at a supply rate of 40 kg/hr followed by adjusting the particle size distribution. After preparing the coating resin solution containing an acrylic resin (BR-80 manufactured by MITSUBISHI RAYON CO., LTD.), the ferrite particles prepared were coated with the coating resin solution using a fluidized-bed coating device to make the weight of the resin 1 wt % against to the ferrite particles. After baking at 145° C. for 2 hours, de-agglomeration was conducted to produce the larger-diameter ferrite particles. Note that the coating resin solution was diluted with a solvent to adjust a resin solid content 10 wt %.

Smaller-diameter ferrite particles: Sphering process was conducted in the same manner described above except for changing the average particle diameter of the granulated product, and smaller-diameter ferrite particles were collected by a filter. The ferrite particles produced were dispersed in water to adjust the solid content 10 wt %, and the aqueous solution of sodium aluminate was dripped into the dispersion slurry to surface-treat the ferrite particles. Further, the aqueous solution of acetic acid was added to adjust the pH of the dispersion slurry 8.5 to 9.0. The amount of the surface treatment agent converted to aluminum was 0.85 wt % against to the ferrite particles. The aqueous solution of sodium aluminate was prepared to adjust an aluminum concentration of 10 wt %. The slurry containing the surface-treated ferrite particles was subjected to filtration, followed by drying at 120° C. for 8 hours to remove water followed by pulverization with a sample mill to produce the ferrite particles surface-treated with an Al compound.

80 wt % of the larger-diameter ferrite particles produced as described above and 20 wt % of the smaller-diameter ferrite particles produced as described above were mixed for 30 minutes to prepare the ferrite powder in Example 1.

Example 2

The ferrite powder was prepared in the same manner as in Example 1, except that 85 wt % of the larger-diameter ferrite particles and 15 wt % of the smaller-diameter ferrite particles were mixed for 30 minutes.

Example 3

A ferrite powder was prepared in the same manner as in Example 1, except that 70 wt % of the larger-diameter ferrite particles and 30 wt % of the smaller-diameter ferrite particles were mixed for 30 minutes.

Example 4

A ferrite powder was prepared in the same manner as in Example 1, except that the average particle diameter of the larger-diameter ferrite particles before resin coating was 50 μm.

Example 5

A ferrite powder was prepared in the same manner as in Example 1, except that larger-diameter ferrite particles and smaller-diameter ferrite particles are produced by blending appropriate amounts of raw materials weighed to adjust the composition of the ferrite powder; $Mn_3O_4$ content of 8 mol %, $Mg(OH)_2$ content of 21 mol %, $Fe_2O_3$ content of 52 mol %, and SrO content of 1 mol %.

80 wt % of the larger-diameter ferrite particles produced as described above and 20 wt % of the smaller-diameter ferrite particles produced as described above were mixed for 30 minutes to prepare the ferrite powder in Example 5.

Example 6

A ferrite powder was prepared in the same manner as in Example 1, except that the larger-diameter ferrite particles and the smaller-diameter ferrite particles are produced by blending appropriate amounts of raw materials weighed to adjust the composition; $Mn_3O_4$ content of 14 mol %, $Mg(OH)_2$ content of 5 mol %, $Fe_2O_3$ content of 52 mol %, and SrO content of 1 mol %.

80 wt % of the larger-diameter ferrite particles produced as described above and 20 wt % of the smaller-diameter ferrite particles produced as described above were mixed for 30 minutes to manufacture the ferrite powder in Example 6.

COMPARATIVE EXAMPLES

Comparative Example 1

The resin-coated larger-diameter ferrite particles in Example 1 were used as the ferrite powder in Comparative Example 1.

Comparative Example 2

A ferrite powder was prepared in the same manner as in Example 1, except that 60 wt % of the larger-diameter ferrite particles and 40 wt % of the smaller-diameter ferrite particles were mixed for 30 minutes.

Comparative Example 3

The larger-diameter ferrite particles in Example 4 before resin-coating were used as a ferrite powder in Comparative Example 3.

Table 1 shows the mixing ratios of the raw materials, the conditions employed in the first calcining (the calcining furnace, calcining temperature, and calcining atmosphere), and the conditions employed in the main sintering in Examples 1 to 6 and Comparative Examples 1 to 3. Table 2 shows the means for collecting the particles, the average particle diameter, the BET specific surface area and the shape factor SF-1 of the ferrite particles before coating, the coated resin, the amount of the coated resin, the coating device, and the content of the resin-coated particles having a particle diameter less than 11 μm for the larger-diameter ferrite particles in Examples 1 to 6 and Comparative Examples 1 to 3. Table 3 shows the means for collecting the particles, the average particle diameter, the BET specific surface area and the shape factor SF-1 of the ferrite particles before surface-treatment, the surface treatment agent, the pH of the ferrite particles dispersed solution in the surface treatment, the amount of the surface treatment agent for the smaller-diameter ferrite particles; and the weight ratio between the mixed ferrite particles (larger-diameter ferrite particles: smaller-diameter ferrite particles) in Examples 1 to 6 and Comparative Examples 1 to 3.

Table 4 shows the chemical composition, the powder properties (the average particle diameter, the content of the particles having the diameter less than 11 μm, and the BET specific surface area), the magnetic properties (VSM magnetization at 5 K·1000/4π·A/m), and the electrical properties (volume resistivity) in Examples 1 to 6 and Comparative Examples 1 to 3. Table 5 and Table 6 show the liquid resin moldability and powder moldability in Examples 1 to 6 and Comparative Examples 1 to 3. The methods of examining the various properties shown in Table 4 are described above. The methods of examining the liquid resin moldability shown in Table 5 and the powder resin moldability shown in Table 6 will be described.

Liquid resin moldability: 10% aqueous PVA solution and a polycarboxylic acid dispersant were added to the ferrite powders prepared in Examples 1 to 6 and Comparative Examples 1 to 3 in the mixing conditions shown in Table 5, and the mixtures were continuously stirred for 30 minutes, and the viscosity was examined using the B-type viscometer after finishing the stirring.

Powder resin moldability: The ferrite powders prepared in Examples 1 to 6 and Comparative Examples 1 to 3 and the fluorine-containing resin powder were put in a 50 cc glass bottle and mixed in the conditions shown in Table 6 using the ball mill for 30 minutes. 0.8 g weighed mixture was packed into a toric press mold having the outer diameter of 13 mm and the inner diameter of 5 mm, and molded by compression at 30 MPa. Whether the molded products was deformed in removing was examined. A molded product that was not deformed was rated as "Good", while a molded product that was deformed was rated as "Not Good".

TABLE 1

|  | Composition (Initially-introduced raw materials: mol) | | | | Conditions of first calcining | | | |
|---|---|---|---|---|---|---|---|---|
|  | $Fe_2O_3$ | $Mn_3O_4$ | $Mg(OH)_2$ | $SrCO_3$ | Calcining furnace | Calcining temperature (°C.) | Calcining atmosphere | Conditions of main sintering |
| Example 1 | 52 | 12 | 11 | 1 | Electric furnace | 1135 | Air | Flame-spraying |
| Example 2 | 52 | 12 | 11 | 1 | Electric furnace | 1135 | Air | Flame-spraying |
| Example 3 | 52 | 12 | 11 | 1 | Electric furnace | 1135 | Air | Flame-spraying |
| Example 4 | 52 | 12 | 11 | 1 | Electric furnace | 1135 | Air | Flame-spraying |
| Example 5 | 52 | 8 | 21 | 1 | Electric furnace | 1135 | Air | Flame-spraying |
| Example 6 | 52 | 14 | 5 | 1 | Electric furnace | 1135 | Air | Flame-spraying |
| Comparative Example 1 | 52 | 12 | 11 | 1 | Electric furnace | 1135 | Air | Flame-spraying |
| Comparative Example 2 | 52 | 12 | 11 | 1 | Electric furnace | 1135 | Air | Flame-spraying |
| Comparative Example 3 | 52 | 12 | 11 | 1 | Electric furnace | 1135 | Air | Flame-spraying |

TABLE 2

| | Larger-diameter ferrite particles | | | | | | | |
|---|---|---|---|---|---|---|---|---|
| | Means for collecting particles | Average particle diameter of ferrite particles before resin coating (μm) | BET specific surface area ($m^2/g$) | SF-1 | Resin coating | Amount of coating (wt %) | Coating device | Content of resin-coated particles having particle diameter less than 11 μm (wt %) |
| Example 1 | Cyclone (fine powder fraction) | 20 | 0.89 | 102 | Acrylic resin (BR-80) | 1 | Fluidized-bed coating device | 0.2 |
| Example 2 | Cyclone (fine powder fraction) | 20 | 0.89 | 102 | Acrylic resin (BR-80) | 1 | Fluidized-bed coating device | 0.2 |
| Example 3 | Cyclone (fine powder fraction) | 20 | 0.89 | 102 | Acrylic resin (BR-80) | 1 | Fluidized-bed coating device | 0.2 |
| Example 4 | Cyclone (coarse powder fraction) | 50 | 0.43 | 101 | Acrylic resin (BR-80) | 1 | Fluidized-bed coating device | 0 |
| Example 5 | Cyclone (coarse powder fraction) | 20 | 0.93 | 102 | Acrylic resin (BR-80) | 0.5 | Fluidized-bed coating device | 0.3 |
| Example 6 | Cyclone (coarse powder fraction) | 20 | 0.82 | 102 | Acrylic resin (BR-80) | 1.5 | Fluidized-bed coating device | 0.1 |

TABLE 2-continued

| | Larger-diameter ferrite particles | | | | | | | |
|---|---|---|---|---|---|---|---|---|
| | Means for collecting particles | Average particle diameter of ferrite particles before resin coating (μm) | BET specific surface area (m²/g) | SF-1 | Resin coating | Amount of coating (wt %) | Coating device | Content of resin-coated particles having particle diameter less than 11 μm (wt %) |
| Comparative Example 1 | Cyclone (coarse powder fraction) | 20 | 0.89 | 102 | Acrylic resin (BR-80) | 1 | Fluidized-bed coating device | 0.2 |
| Comparative Example 2 | Cyclone (coarse powder fraction) | 20 | 0.89 | 102 | Acrylic resin (BR-80) | 1 | Fluidized-bed coating device | 0.2 |
| Comparative Example 3 | Cyclone (coarse powder fraction) | 50 | 0.43 | 101 | Not applicable | | | 0.4 |

TABLE 3

| | Smaller-diameter ferrite particles | | | | | | | Weight ratio between mixed ferrite particles (larger-diameter ferrite particles: smaller-diameter ferrite particles) |
|---|---|---|---|---|---|---|---|---|
| | Means for collecting particles | Average particle diameter of ferrite particles before surface-treatment (μm) | BET specific surface area (m²/g) | SF-1 | Surface treatment agent | pH of ferrite particles dispersed solution in surface treatment | Amount of surface treatment agent (converted to Al) (wt %) | |
| Example 1 | Bag filter | 0.087 | 24.37 | 107 | Al$_2$(SO$_4$)$_3$ | pH 8.5-9 | 0.85 | 80:20 |
| Example 2 | Bag filter | 0.087 | 24.37 | 107 | Al$_2$(SO$_4$)$_3$ | pH 8.5-9 | 0.85 | 85:15 |
| Example 3 | Bag filter | 0.087 | 24.37 | 107 | Al$_2$(SO$_4$)$_3$ | pH 8.5-9 | 0.85 | 70:30 |
| Example 4 | Bag filter | 0.087 | 24.37 | 107 | Al$_2$(SO$_4$)$_3$ | pH 8.5-9 | 0.85 | 80:20 |
| Example 5 | Bag filter | 0.066 | 28.81 | 107 | Al$_2$(SO$_4$)$_3$ | pH 8.5-9 | 0.85 | 80:20 |
| Example 6 | Bag filter | 0.075 | 22.53 | 107 | Al$_2$(SO$_4$)$_3$ | pH 8.5-9 | 0.85 | 80:20 |
| Comparative Example 1 | Bag filter | Not applicable | | | | | | 100:0 |
| Comparative Example 2 | Bag filter | 0.087 | 24.37 | 107 | Al$_2$(SO$_4$)$_3$ | pH 8.5-9 | 0.85 | 60:40 |
| Comparative Example 3 | Bag filter | Not applicable | | | | | | 100:0 |

TABLE 4

| | Powder properties | | | | | | | | | | | | |
|---|---|---|---|---|---|---|---|---|---|---|---|---|---|
| | Chemical composition (ICP analysis) (wt %) | | | | Particle diameter distribution Content (%) | | | | | Average particle diameter (μm) | BET specific surface area (m²/g) | Magnetic properties VSM magnetization *(Am²/kg) | Electrical properties Volume resistivity (Ω · cm) |
| | Fe | Mn | Mg | Sr | Less than 7.8 μm | 7.8- 11 μm | 11- 62 μm | 62 μm or more | Less than 11 μm | | | | |
| Example 1 | 51.24 | 17.41 | 2.13 | 0.77 | 17.18 | 3.66 | 76.6 | 2.56 | 20.84 | 16.25 | 5.79 | 61.46 | 6.8 × 10$^7$ |
| Example 2 | 51.37 | 17.35 | 2.1 | 0.72 | 12.99 | 2.82 | 80.82 | 3.37 | 15.81 | 17.31 | 4.62 | 64.22 | 3.4 × 10$^8$ |
| Example 3 | 51.19 | 17.38 | 2.15 | 0.81 | 27.35 | 1.96 | 69.97 | 0.72 | 29.31 | 14.28 | 8.14 | 54.82 | 9.7 × 10$^6$ |
| Example 4 | 51.61 | 17.54 | 2.09 | 0.78 | 19.09 | 1.74 | 76.73 | 2.44 | 20.83 | 40.29 | 5.42 | 65.62 | 6.1 × 10$^6$ |
| Example 5 | 54.19 | 12.29 | 4.57 | 0.81 | 18.76 | 1.98 | 76.5 | 2.76 | 20.74 | 16.3 | 6.71 | 54.7 | 7.7 × 10$^8$ |
| Example 6 | 50.54 | 20.11 | 0.96 | 0.76 | 17.08 | 3.84 | 76.27 | 2.81 | 20.92 | 16.27 | 5.37 | 65.36 | 3.8 × 10$^6$ |
| Comparative Example 1 | 52.09 | 17.11 | 2.05 | 0.7 | 0.22 | 0.64 | 91.83 | 7.31 | 0.86 | 20.28 | 1.1 | 75.87 | Not measurable (1 × 10$^{12}$ or more) |
| Comparative Example 2 | 51.88 | 16.98 | 2.28 | 0.85 | 41.65 | 0.2 | 58.15 | 0 | 41.85 | 9.33 | 12.48 | 53.54 | 2.5 × 10$^6$ |
| Comparative Example 3 | 51.88 | 17.52 | 1.98 | 0.78 | 0.42 | 0.4 | 91.63 | 7.55 | 0.82 | 50.29 | 0.64 | 65.62 | Not measurable (less than 1 × 10$^6$) |

*Magnetization at 5K · 1000/4π · A/m

TABLE 5

| | Ferrite powder used | Mixing conditions | | | | Liquid resin moldability |
| | | Weight of ferrite powder (wt %) | Weight of aqueous PVA solution (wt %) | Weight of dispersant (wt %) | Solid content of ferrite powder (wt %) | (alternative property using aqueous PVA solution) viscosity (cSt) |
|---|---|---|---|---|---|---|
| Example 1 | Example 1 | 80 | 20 | 1 | 79.21 | 58000 |
| Example 2 | Example 2 | 80 | 20 | 1 | 79.21 | 46000 |
| Example 3 | Example 3 | 80 | 20 | 1 | 79.21 | 81000 |
| Example 4 | Example 4 | 80 | 20 | 1 | 79.21 | 54000 |
| Example 5 | Example 5 | 80 | 20 | 1 | 79.21 | 67000 |
| Example 6 | Example 6 | 80 | 20 | 1 | 79.21 | 54000 |
| Example 7 | Example 2 | 96 | 4 | 1.25 | 94.81 | 87000 |
| Example 8 | Example 3 | 70 | 30 | 0.5 | 69.65 | 25000 |
| Example 9 | Example 1 | 90 | 10 | 0.75 | 89.33 | 81000 |
| Comparative Example 1 | Comparative Example 1 | 80 | 20 | 1 | 79.21 | 9500 |
| Comparative Example 2 | Comparative Example 2 | 80 | 20 | 1 | 79.21 | 125000 |
| Comparative Example 3 | Comparative Example 3 | 80 | 20 | 1 | 79.21 | 5500 |

TABLE 6

| | Ferrite powder used | Mixing conditions | | | Powder resin moldability (fluorine-containing resin) |
| | | Weight of ferrite powder (wt %) | Weight of fluorine-containing resin (wt %) | Solid content of ferrite powder (wt %) | |
|---|---|---|---|---|---|
| Example 1 | Example 1 | 19 | 1 | 95 | Good |
| Example 2 | Example 2 | 19 | 1 | 95 | Good |
| Example 3 | Example 3 | 19 | 1 | 95 | Good |
| Example 4 | Example 4 | 19 | 1 | 95 | Good |
| Example 5 | Example 5 | 19 | 1 | 95 | Good |
| Example 6 | Example 6 | 19 | 1 | 95 | Good |
| Example 7 | Example 2 | 19.5 | 0.5 | 98 | Good |
| Example 8 | Example 3 | 18 | 2 | 80 | Good |
| Example 9 | Example 1 | 19.2 | 0.8 | 96 | Good |
| Comparative Example 1 | Comparative Example 1 | 19 | 1 | 95 | Not Good |
| Comparative Example 2 | Comparative Example 2 | 19 | 1 | 95 | Good |
| Comparative Example 3 | Comparative Example 3 | 19 | 1 | 95 | Not Good |

As is apparent in Tables 4 to 6, the ferrite powders in Examples 1 to 6 not only have high resistivity and are controllable in viscosity sufficiently even if added to a high-viscosity liquid, but also reduce the occurrence of deformation in powder molding.

In contrast, as the ferrite powder in Comparative Example 1 excludes smaller-diameter ferrite particles, moldability is poor. As the ferrite powder in Comparative Example 2 contains too much smaller-diameter ferrite particles, viscosity could not be controlled even if the dispersant for viscosity control is added to the high-viscus liquid, i.e. the ferrite powder cannot be used as a filler. As the larger-diameter ferrite particles are not resin-coated in Comparative Example 3, resistivity is low and cannot be used in applications that require insulating properties.

INDUSTRIAL APPLICABILITY

The ferrite powder according to the present invention used as a filler is good in filling ability and moldability, is excellent in handling ability, and is high in resistivity also. So, the molded product manufactured by molding a resin compound produced by mixing the spherical ferrite powder and a resin can be used in various applications, such as the sealing material of IC for electromagnetic wave absorption.

The invention claimed is:

1. A spherical ferrite powder comprising a mixture of:
   spherical ferrite particles having a particle diameter of less than 11 μm; and
   spherical ferrite particles having a particle diameter of 11 μm or more;
   wherein:
   the spherical ferrite particles having a particle diameter of less than 11 μm have a BET specific surface area of 2 to 50 $m^2/g$;
   the spherical ferrite particles having a particle diameter of 11 μm or more have a BET specific surface area of 0.1 to 2 $m^2/g$;
   an amount of the spherical ferrite particles having a particle diameter of less than 11 μm present in the mixture is 15 to 30 wt % of a total weight of the mixture; and
   a volume average particle diameter of the mixture of spherical ferrite particles is 10 to 50 μm.

2. The spherical ferrite powder according to claim 1, wherein the ferrite particles having the particle diameter of 11 μm or more are coated with a resin.

3. A resin compound including 50 to 99.5 wt % of the spherical ferrite powder according to claim 2.

4. A molded product formed by molding the resin compound according to claim 3.

5. A resin compound including 50 to 99.5 wt % of the spherical ferrite powder according to claim 1.

6. A molded product formed by molding the resin compound according to claim 5.

* * * * *